United States Patent [19]

Beeler

[11] 4,095,838
[45] Jun. 20, 1978

[54] TRUCK EXTENSION

[75] Inventor: Arnold A. Beeler, Fergus Falls, Minn.

[73] Assignee: The Raymond Lee Organization, Inc., New York, N.Y.

[21] Appl. No.: 721,917

[22] Filed: Sep. 9, 1976

[51] Int. Cl.² ............................................. B62D 21/14
[52] U.S. Cl. ......................................... 296/26; 52/64; 160/327
[58] Field of Search ................. 296/26, 27, 36, 10, 296/23 C; 52/66, 64, DIG. 3; 160/327

[56] References Cited

U.S. PATENT DOCUMENTS

| 2,322,931 | 6/1943 | Gottfried | 296/27 |
| 2,797,124 | 6/1957 | Hauptli | 296/26 |
| 3,184,261 | 5/1965 | Young | 296/26 |
| 3,924,889 | 12/1975 | Gogush | 296/26 |

FOREIGN PATENT DOCUMENTS

| 640,844 | 4/1928 | France | 296/27 |

Primary Examiner—John A. Pekar
Attorney, Agent, or Firm—Howard I. Podell

[57] ABSTRACT

A foldable extension to the top of the sides of an open truck or trailer body for increasing the volume of the truck body. The extension consists of a fabric material mounted along the top edge of a truck body side and fitted with a plurality of hinged supports which can be extended in to serve as vertical supports to the fabric.

2 Claims, 5 Drawing Figures

TRUCK EXTENSION

SUMMARY OF THE INVENTION

My invention is a foldable extension to the top of the sides of an open truck or trailer body for increasing the volume of the truck body. The extension consists of a fabric material mounted along the top edge of a truck body side and fitted with a plurality of hinged supports which can be extended in to serve as vertical supports to the fabric.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
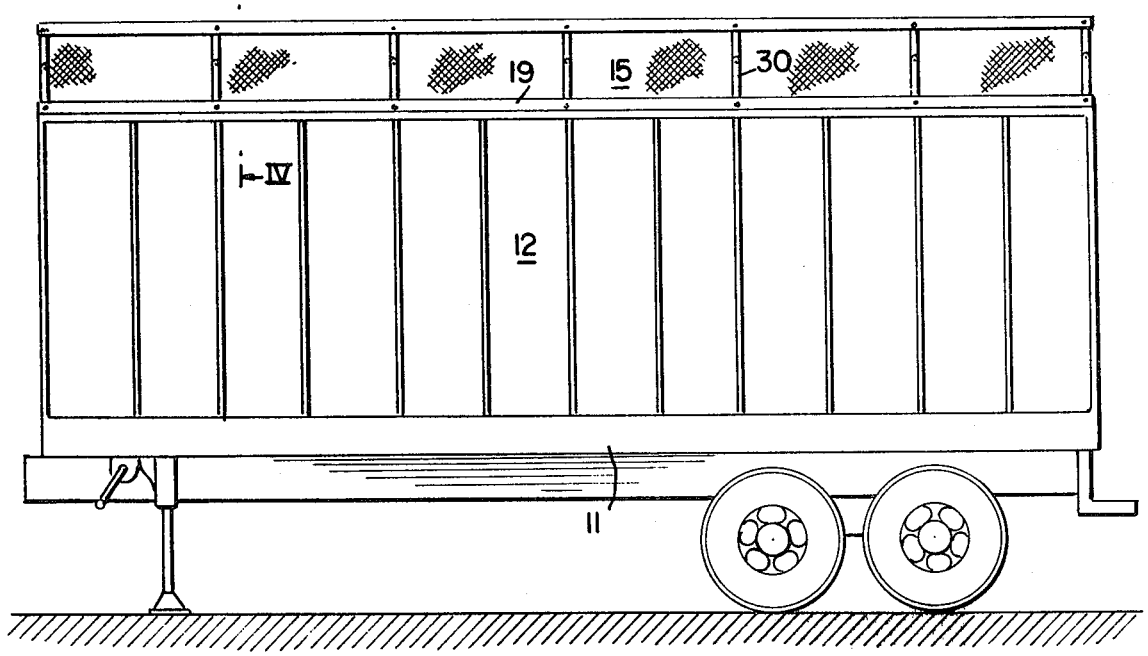
FIG. 1 is an elevation view of a trailer body fitted with the invention.
Figure 2:
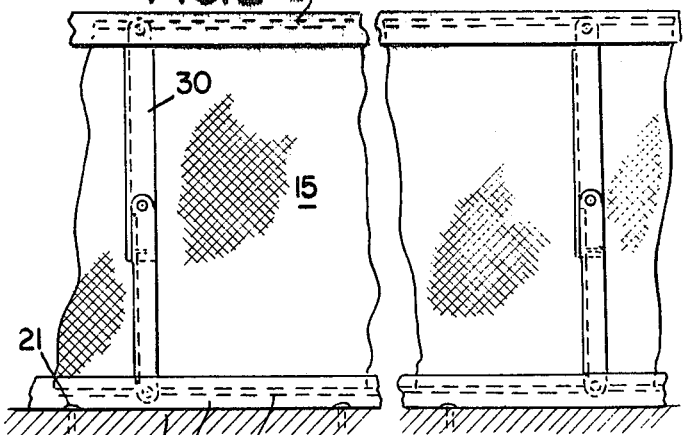
FIG. 2 is a detail side view of the invention in the extended mode.

Turning now descriptively to the drawings, in which similar reference characters denote similar elements throughout the several views, FIG. 1 illustrates a trailer 11, the sides 12 of which are fitted with the extendable sides 10 of the invention. Since the invention is similarly adaptable to attachment to truck or trailer bodies, the following description will describe the invention in terms of a truck body with the understanding that both the terms trailer and truck bodies are interchangeable.

Truck body 11 is fitted with side 12 bounding open top, with the invention 10 adaptable for installation on each side 12, and about the front end side and the rear end side (not shown).

A flexible fabric 15 is fitted individually about its upper border 16 and lower border 17 to a draw string 18 with the lower draw string 18 and border 17 fixed to a channel member 19 mounted by bolt 21 to the top rim 22 of a truck side 12. The upper border 16 and draw string 18 is similarly fixed to a channel member 23 mounted in parallel configuration to channel member 19. Preferably channel member 19 and 23 are in the form of U-shaped sections; mounted with the open portion of each channel facing the other.

A plurality of similar spaced jack-knife support members 30 join each pair of channel members 19 and 23.

Figures 4, 5:
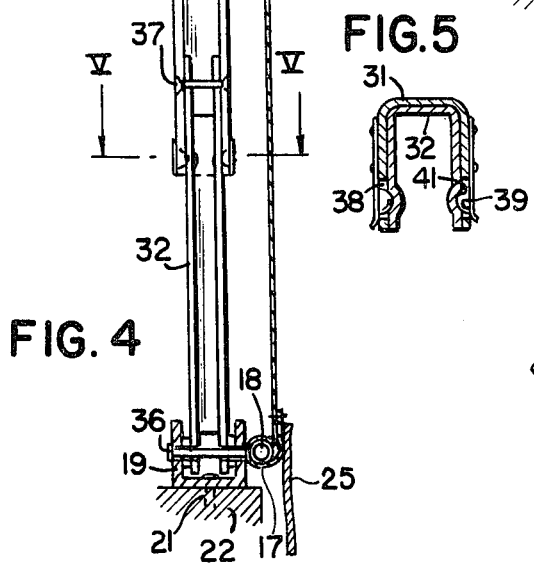
FIG. 4 is a sectional view of the invention, taken along line 4—4 of FIG. 1.
FIG. 5 is a sectional view of the invention, taken along line 5—5 of FIG. 4.
Figure 3:
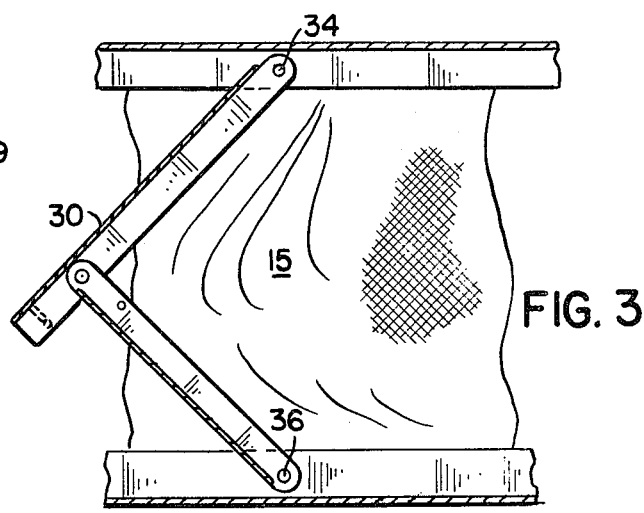
FIG. 3 is a detail side view of the invention in a partially retracted mode.

Each support member 30 is formed of a pair of U-shaped channel section support legs 31 and 32 with leg section 32 of a size to fit inside leg section 31. Leg section 31 is pivotably joined by rivet 34 to top channel 23 and leg section 32 is similarly pivotably joined by a rivet 35 to lower channel 19 by a rivet 36 with both support legs 31 and 32 pivotably joined together by rivet 37. Two spring detents 39 are mounted to leg section 32 to project through a hole 38 in leg section 31 to engage an individual recess 41 in leg section 32 in the extended position of both leg sections 31 and 32, as shown in FIG. 5.

Leg sections 31 and 32 are each of a size to nest inside of channel members 23 and 19 respectively in the retracted position.

A flexible fabric sheet 25 is fastened to the lower border 17 of fabric 15 so as to hand as a short skirt inside the truck side 12.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A foldable extension adaptable for mounting to the top of a side of a truck for increasing the volume of the body of the truck comprising
    a flexible fabric material,
    a pair of channel members each externally fixed to an opposed longitudinal border of the fabric, and
    a plurality of jack-knife foldable support assemblies that pivotally join the two channel members, with
    each side channel member formed of a U-shaped section, and oriented so that the open portion of each channel member faces the open portion of the other, and
    each foldable support assembly is formed of a pair of U-shaped channel section support legs pivotally joined together, with each support leg pivotally extending into an open portion of a channel member to which it is pivotally joined and with a first support leg extending into an open portion of a second support leg,
    said support legs of a size such that the first support leg fits into the open portion of the second support leg, in the folded condition of the support legs, and each said leg of a size to fit into the open portion of each channel member so that in the retracted folded positon of the device the legs of the foldable support assembly rest inside the open portion of the channel members.

2. The combination as recited in claim 1 in which one of the channel members is fixed to the top of a side of said truck body.

* * * * *